US005498838A

United States Patent [19]

Furman

[11] Patent Number: 5,498,838

[45] Date of Patent: Mar. 12, 1996

[54] MODULAR ELECTRICAL CONTACT ASSEMBLIES

[75] Inventor: Lev B. Furman, Santa Ana, Calif.

[73] Assignee: The Whitaker Corporation, Wilmington, Del.

[21] Appl. No.: 514,343

[22] Filed: Aug. 9, 1995

Related U.S. Application Data

[63] Continuation of Ser. No. 122,865, Sep. 16, 1993, abandoned.

[51] Int. Cl.[6] .......... H02G 15/02; H01R 4/00; H01R 4/10; H01R 9/24

[52] U.S. Cl. .......... 174/74 R; 174/75 R; 174/75 D; 174/845; 174/945; 439/879; 439/891; 439/905

[58] Field of Search .......... 174/74 R, 75 D, 174/75 R, 73.1, 84 C, 84 S, 88 S, 91, 94 S; 439/879, 877, 891, 904, 905, 906, 924

[56] References Cited

U.S. PATENT DOCUMENTS

| | | | |
|---|---|---|---|
| 1,975,885 | 10/1934 | Wellman . | |
| 3,081,528 | 3/1963 | Hanna | 29/155.55 |
| 3,257,636 | 6/1966 | Van Horssen | 339/218 |
| 3,564,487 | 2/1971 | Upstone et al. | 339/258 |
| 3,740,839 | 6/1973 | Otte et al. | 29/628 |
| 3,842,497 | 10/1974 | Kehl et al. | 29/628 |
| 4,072,394 | 2/1978 | Waldron et al. | 339/276 T |
| 4,120,556 | 10/1978 | Waldron et al. | 339/142 |
| 4,184,736 | 1/1980 | Spaulding | 339/258 R |
| 4,262,987 | 4/1981 | Gallusser et al. | 339/258 R |
| 4,275,948 | 6/1981 | Gallusser et al. | 339/218 R |
| 4,365,412 | 12/1982 | Marsh | 29/863 |
| 4,373,773 | 2/1983 | Piscitelli et al. | 339/262 R |
| 4,434,552 | 3/1984 | Brush, Sr. et al. | 29/876 |
| 4,563,055 | 1/1986 | Hemmer | 339/262 R |
| 4,566,752 | 1/1986 | Hemmer | 339/262 R |
| 4,685,761 | 8/1987 | Locati | 439/843 |
| 4,703,986 | 11/1987 | McCormick | 439/607 |
| 5,217,391 | 6/1993 | Fisher | 439/578 |
| 5,266,912 | 11/1993 | Kledzik | 333/247 |
| 5,329,262 | 7/1994 | Fisher | 333/33 |

FOREIGN PATENT DOCUMENTS

| | | | |
|---|---|---|---|
| 2652250 | 3/1976 | Germany | 439/877 |
| 2498827 | 1/1981 | Germany | 439/879 |
| 1497084 | 1/1978 | United Kingdom | 174/74 R |

*Primary Examiner*—Leo P. Picard
*Assistant Examiner*—Stephen T. Ryan
*Attorney, Agent, or Firm*—Anton P. Ness

[57] ABSTRACT

A modular contact assembly including first and second members at opposed ends such as a wire barrel member (20) or a contact member (50,100) having either a socket contact section (62) or a pin contact section (108) at a mating end, and optionally an intermediate member (80) interposable between the first and second members. Assembly faces (30,84) of one of the members (20) and intermediate member (80) each may include a small diameter bore (28,82) thereinto, and mounting faces (54,88) of the other of the members and intermediate member each may include a cylindrical embossment (56,86) extending therefrom having a diameter slightly larger than that of the small diameter bores, enabling force fittable insertion thereinto during contact assembly. The wire barrel member (20) is usable with either a pin contact member (100) or a socket contact member (50), and the intermediate member (80) enables fabrication of an elongate socket contact assembly (10) or pin contact assembly if desired.

15 Claims, 4 Drawing Sheets

MODULAR ELECTRICAL CONTACT ASSEMBLIES

This application is a continuation of application Ser. No. 08/122,865 filed Sep. 16, 1993, now abandoned.

FIELD OF THE INVENTION

The present invention relates to electrical contacts and more particularly to pin and socket contacts.

BACKGROUND OF THE INVENTION

Electrical contacts of many designs and configurations are known which have a pin contact section at an end thereof or which have a socket contact section matable with a pin contact section. Many such contacts are applied to ends of wires to terminate the conductors thereof such as by crimping or by soldering procedures. In several of such contacts, the contact is terminated to the conductor by inserting the stripped conductor end into a barrel-shaped section at one end of the contact, with the contact having at the other end a contact section having either a pin shape or a socket shape matable with, and unmatable from, a pin shape of a complementary contact to define an electrical connection. Such contacts are disclosed in U.S. Pat. Nos. 3,564,487; 4,275,948; 4,373,773 and 4,434,552.

In U.S. Pat. No. 4,685,761 is disclosed a socket contact matable with a pin contact, wherein the socket contact includes a rearward section which is machined from solid stock to define a wire barrel at one end having a bore of large enough diameter to permit insertion of a conductor end thereinto for crimping (or soldering), and a small diameter bore at the other end. A forward section is stamped from sheet metal and formed into a tubular shape, and includes a plurality of spring arms extending to converging leading ends to define a pin-receiving socket contact section at one end, and including at the other end a C-shaped section having a diameter greater than the diameter of the small diameter bore of the rearward section. The forward section is affixable to the rearward section by forcing the C-shaped section into the small diameter blind bore, with the reduction in diameter of the C-shaped section being sufficient to create a substantial friction fit within the bore, securing the rearward and forward sections together. A hood member is then preferably secured to the assembly over the forward section by being crimped to the rearward section at an annular groove thereof, to establish a protective shroud about the spring arms and to align the mating pin prior to engagement with the spring arms. The rearward section may be formed of copper alloy such as by screw machining, or of soft copper such as by cold-forming techniques. The forward section is said to be stamped of beryllium copper; such alloy provides substantial spring properties necessary for functioning of the spring arms during mating with a pin section and which also enables the sufficient level of force-fit of the C-shaped section into the small diameter bore.

SUMMARY OF THE INVENTION

In its broadest aspect, the present invention is a matrix of parts securable together to define a contact assembly and a system for securing the desired parts together, enabling a few distinct parts to be utilized in modular fashion to result in a variety of different assemblies for different purposes, but all having connection sections at the opposed ends to form a discrete electrical connection or circuit between electrical articles.

In one particular arrangement, the present invention is an assembly of a pin contact in one embodiment, and a socket contact in another embodiment, wherein a common rearward section is a discrete member defining a wire barrel and is useful with either embodiment, and the contact connection section is defined on a separate member affixable to the rearward section and may be either a pin contact section or a socket contact section. Further, either embodiment may be lengthened if desired by placement of an intermediate section between the forward or contact section and the rearward section.

The rearward member is formed of solid stock and includes an aperture extending into the rear or wire face thereof of a selected diameter to define a wire barrel to enable receipt thereinto of a stripped conductor end portion for termination by crimping or solder. The rearward member further includes a small diameter bore extending into the front or assembly face thereof.

Each of the embodiments of the forward member includes a connection section at a forward end thereof, which is either a pin contact section or a socket contact section. At a rear or mounting face thereof is a cylindrical embossment having a diameter just slightly larger than the diameter of the small diameter bore of the rearward member, enabling force fit thereinto sufficient to retain the forward member mechanically secured to the rearward member.

The intermediate member has at one end a cylindrical embossment having a diameter just slightly larger than the diameter of the small diameter bore of the rearward member for force fit thereinto, and a small diameter bore extending into the other end enabling force fit receipt thereinto of a cylindrical embossment of a forward member, defining an elongate contact assembly.

A kit of parts to assemble a contact assembly of a particular size would include a rearward member, both a pin contact forward member and a socket contact forward member, and at least one intermediate member of selected length and possibly several intermediate members of different lengths to permit custom assembly of the contact assembly by a customer.

Other embodiments include a pin contact section securable directly to a socket contact section; the matrix can include a solder tail contact section securable to a pin contact or a socket contact; an intermediate member can have a cylindrical cross-section, or a hexagonal or other cross-section if desired.

It is an objective of the present invention to provide a matrix of a few parts which may be assembled together as desired to result in distinctly different contact assemblies for different purposes.

It is also an objective of the present invention to provide a modular contact assembly wherein one wire barrel member is usable to form either a pin contact assembly or a socket contact assembly in a simplified assembly process and simplifying inventory.

It is a further objective of the present invention to provide such a modular contact assembly wherein inexpensive brass may be used to form the wire barrel requiring no annealing and yet enabling the fabrication of a quality performance contact assembly.

It is additionally an objective to provide for such contact assemblies differing only in length, by providing for a common intermediate member easily incorporated into the contact assembly, or a kit including several such intermediate members of different lengths.

Embodiments of the present invention will now be described by way of example with reference to the accompanying drawings.

DETAILED DESCRIPTION OF THE PREFERRED EMBODIMENTS

Figures 1, 2:
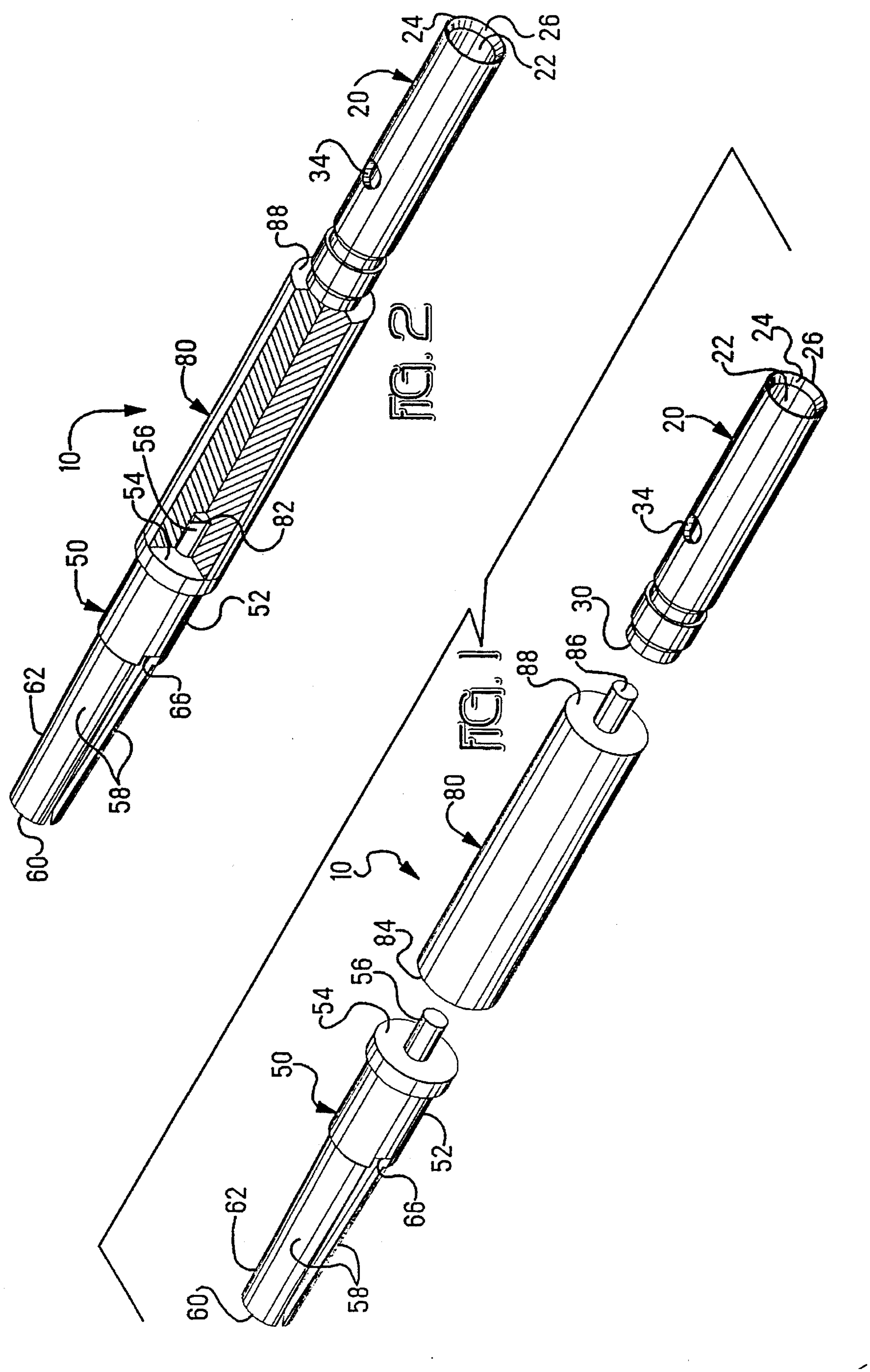
FIGS. 1 and 2 are isometric views exploded and assembled, partially broken respectively, of a socket contact assembly of the present invention.
Figure 3:
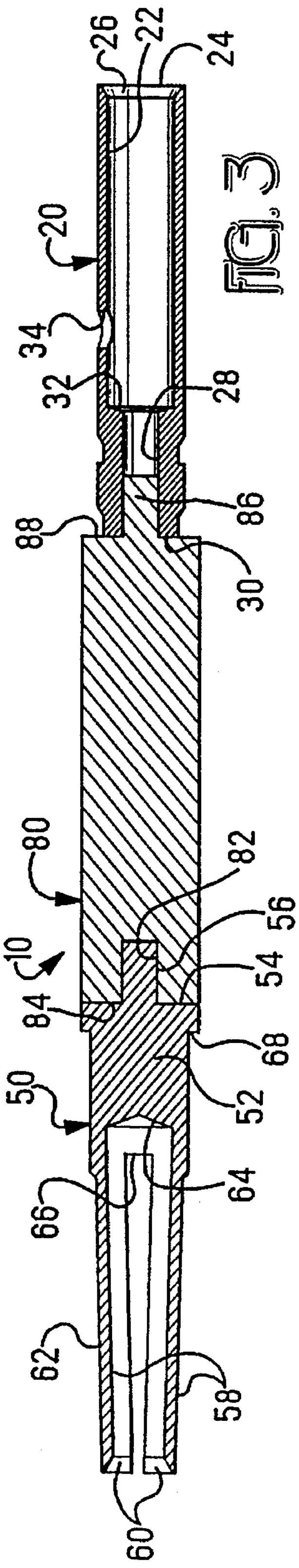
FIG. 3 is a longitudinal section view of the socket contact assembly of FIG. 2.

FIGS. 1 to 3 illustrate a socket contact assembly 10 including a wire barrel member 20, socket contact member 50 and intermediate member 80. Wire barrel member 20 includes an aperture 22 defined into rear or wire-receiving face 24 and having a diameter selected to be larger than the diameter of the stripped conductor of a wire having a gage for which the contact assembly is designed such as for Size 18 AWG wire; a chamfer 26 is preferably formed about the entrance to aperture 22 defining a leadin facilitating receipt of the wire end thereinto. A bore 28 is defined into forward or assembly face 30 having a selected diameter smaller than the diameter of wire barrel mender. Wire barrel 20 is shown to have bore 28 in communication with aperture 22 at aperture bottom 32. An opening 34 is preferably formed to enable visual inspection to verify that a wire end has been inserted sufficiently far to permit proper termination of wire barrel member thereto.

Socket contact member 50 includes a body section 52 extending rearwardly to mounting face 54, rearwardly from which extends a cylindrical embossment 56 having a diameter slightly larger than the diameter of small diameter bore 28 of wire barrel member 20. A plurality of spring arms 58 extend forwardly from body section 52 to leading ends 60 and define a socket contact section 62. Spring arms 58 can be formed by an aperture 64 being formed into front face of an initially solid member and extending to body section 52; slots 66 are machined into the walls surrounding the aperture 64 creating discrete arms; spring arms 58 are then struck radially inwardly to converge slightly at leading ends 60 to create a pin-receiving entrance for receipt thereinto of a complementary pin contact section of a mating contact assembly during conventional mating procedures, and unmatable thereform.

Leading ends 60 are preferably formed to have chamfered pin-engaging surfaces 66 defining a leadin for pin receipt; leading ends 60 engage side surfaces of the pin during contact mating under spring bias to establish assured electrical connection therewith and be wiped therealong to dislodge the corrosion layer tending to form on contact surfaces, with spring arms 58 able to be deflected radially outwardly upon engagement with the pin contact section.

Socket contact assembly 10 is shown to include an intermediate member 80 of selected length and formed of solid stock to have a small diameter bore 82 into forward face 84 and a small diameter cylindrical embossment 86 extending from rearward face 88. Cylindrical embossment 86 is of a diameter slightly larger than the diameter of small diameter bore 28 of wire barrel member 20 and preferably equal to the diameter of cylindrical embossment 56 of socket contact member 50, while small diameter bore 82 is preferably equal to the diameter of small diameter bore 28 of wire barrel member 20 which is slightly smaller than cylindrical embossment 56 of socket contact member 50.

Socket contact assembly 10 is assembled by force fitting cylindrical embossment 56 of socket contact member 50 into small diameter bore 82 of intermediate member 80, and force fitting cylindrical embossment 86 of intermediate member 80 into small diameter bore 28 of wire barrel member 20. Examples of dimensions for a satisfactory contact assembly for use with a Size 20 wire, for example, would be a wire receiving aperture 22 having an inner diameter of 0.050 inches, small diameter bores 28 and 82 of 0.0350 to 0.0347 inches in diameter, and small diameter cylindrical embossments 56 and 86 of 0.0358 to 0.0355 inches, while the socket contact member could have a pair of spring arms 58 with the pinreceiving bore 64 having an initially formed inner diameter of about 0.0460 inches. The fitting of cylindrical embossments 56 and 86 into cylindrical bores 82 and 28 respectively would result in a retentive friction force of about twenty-six (26) to about twenty-eight (28) pounds. Tooling (not shown) may use forward face 84 to apply sufficient insertion force to assemble intermediate member 80 to wire barrel member 20; tooling may use forwardly facing annular ledge 68 along body section 52 to assembly socket contact member 50 to intermediate member 80. Such insertion force may be from about 27 to about 30 pounds, for example, sufficient to provide a durable joint between the members to define an assembly capable of being manipulated as a unit to be subsequently electrically connected to other electrical articles for interconnecting them.

Wire barrel member 20 and intermediate member 80 may be machined for example of brass stock and then plated with gold flash. Socket contact member 50 may be machined of leaded nickel copper alloy and then gold plated at least selectively along inside surfaces of spring arms 58.

Figure 4:
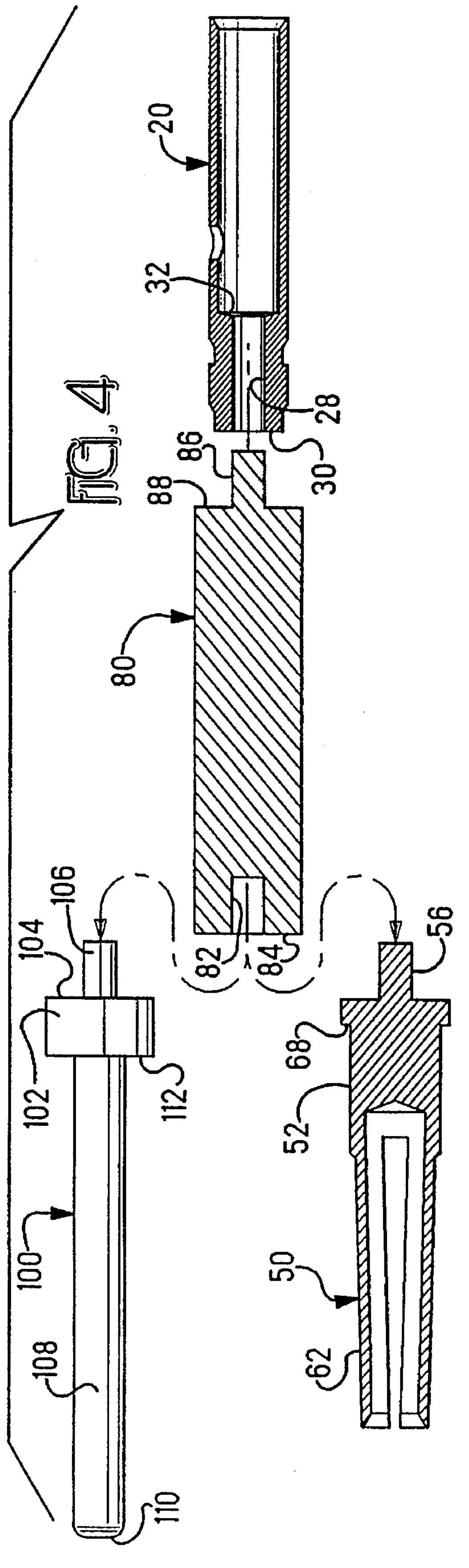
FIG. 4 ms a longitudinal exploded section view of the rearward and intermediate menders of the contact assembly of FIGS. 1 to 3, with a socket contact forward member and a pin contact forward member, either of which is assembleable to the forward end of the intermediate member as desired.

In FIG. 4 wire barrel member 20 and intermediate member 80 are shown able to be used with socket contact member 50 as in FIGS. 1 to 3, and also with a pin contact member 100, which has a body section 102 extending to a mounting face 104 rearwardly from which extends a small diameter cylindrical embossment 106, as with socket contact member 50. A pin contact section 108 extends forwardly from body section 102 to a leading end 110, preferably rounded, and would be matable with, and unmatable from a socket contact section like that of socket contact member 50. Tooling may use forwardly facing annular ledge 112 to apply sufficient force to assemble pin contact member 100 to intermediate member 80.

Figure 5:
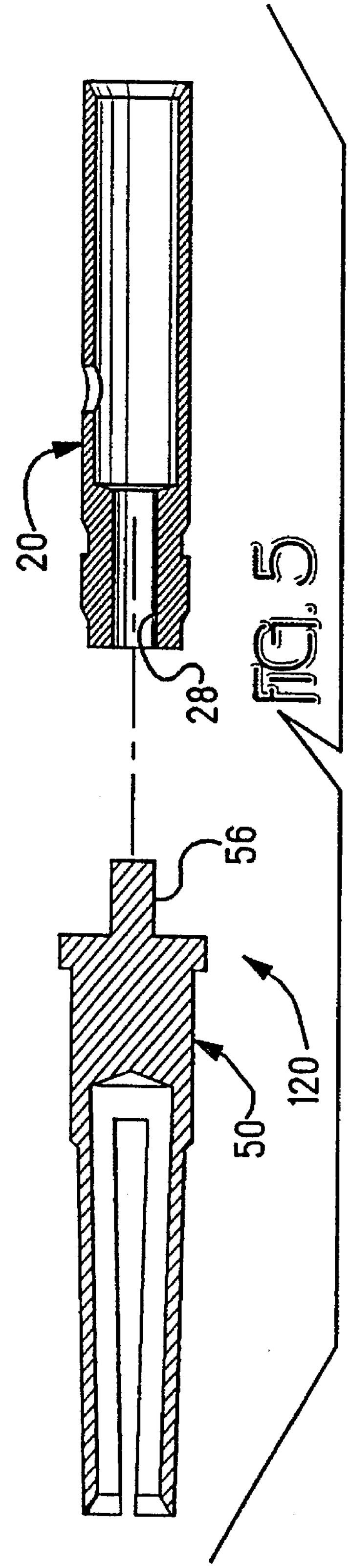
FIG. 5 is an exploded longitudinal section view of a socket contact assembly of the present invention comprised only of a socket contact forward member and a wire barrel member.

FIG. 5 shows a socket contact assembly 120 including only a socket contact member 50 and wire barrel member 20, with cylindrical embossment 56 force fitted into small diameter bore 28, and defining a shorter contact assembly than assembly 10 of FIGS. 1 to 3.

Figure 6:
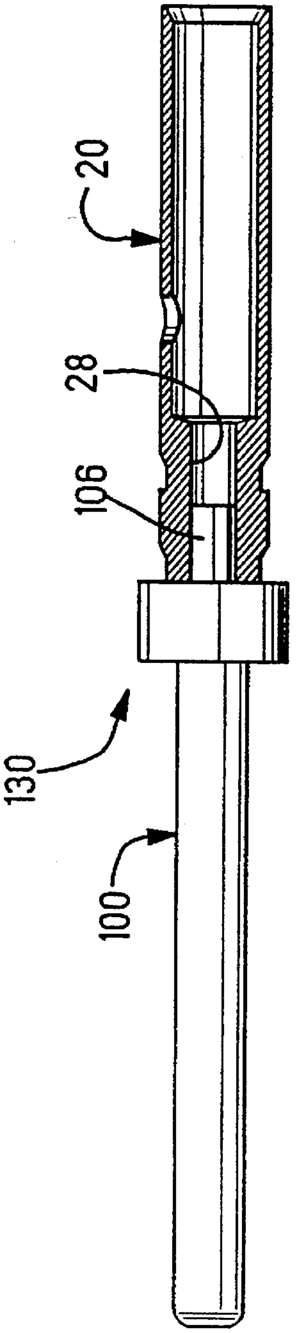
FIG. 6 is an assembled partially sectioned view of a pin contact assembly of the present invention comprised only of a pin contact forward member and a wire barrel member.

Likewise FIG. 6 shows a pin contact assembly 130 including only a pin contact member 100 and wire barrel member 20, with cylindrical embossment 106 force fitted into small diameter bore 28, and defining a shorter contact assembly than one utilizing an intermediate member such as member 80.

Figure 7:
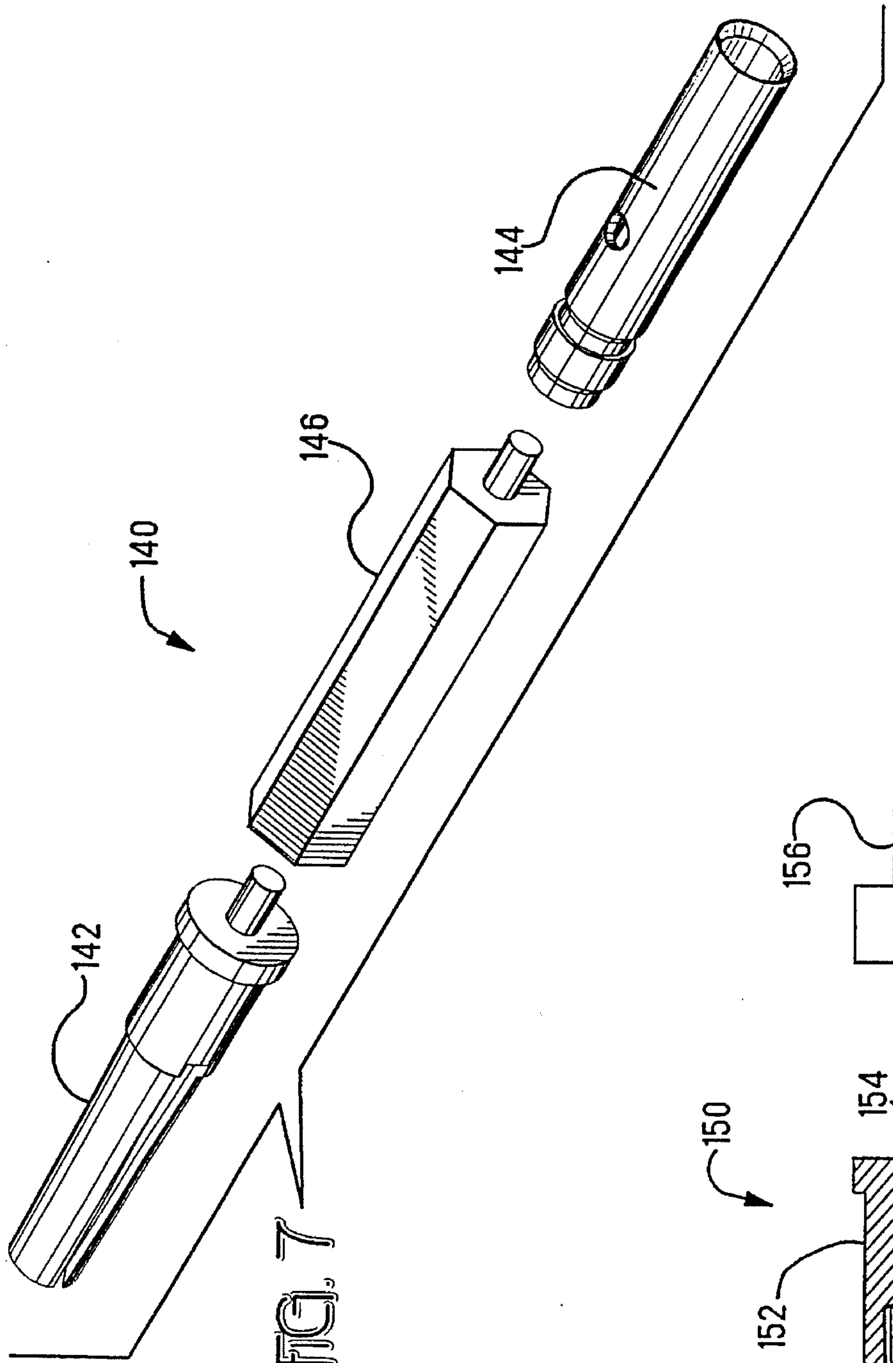
FIG. 7 is an alternate embodiment illustrating an intermediate member of hexagonal cross-section.
Figure 8:
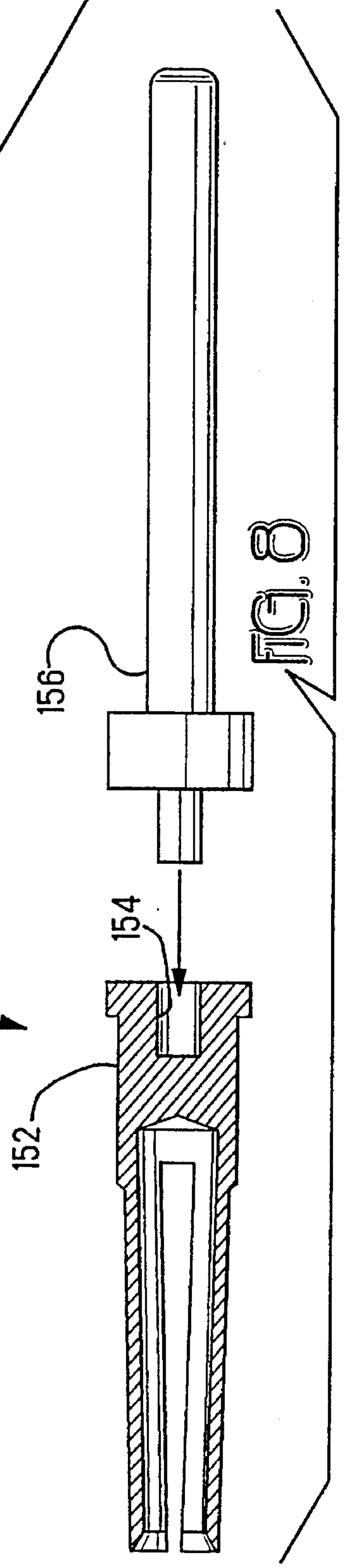
FIG. 8 is an alternate embodiment illustrating a pin contact section securable directly to a socket contact section.

FIGS. 7 and 8 show additional embodiments illustrating the modular nature of the present invention in defining a matrix system for creating a multiplicity of distinct assemblies from a few parts. Contact assembly 140 has first and second members 142,144 such as a socket contact section and a wire barrel as shown, and which utilizes an intermediate member 146 having a cross-section which is hexagonal in shape enabling placement within a housing for example which can define an antirotation mechanism in conjunction with a shaped passageway, or which can facilitate being held by a tool without rotating. Contact assembly 150 in FIG. 8 illustrates a socket contact section 152 having a bore 154 thereinto enabling a pin contact section 156 to be secured thereto, if desired.

It can be seen that the securing sections of the contact members can be defined as either the embossment or the small diameter bore, as desired. Other variations of the invention can provide an intermediate member having small diameter bores at each of the mounting faces for receipt of embossments of members, or having embossments for being received into small diameter bores of the contact members, if desired, at the assembly interfaces.

The present invention thus is shown to be modular, with wire barrel assembleable to either a socket contact member or a pin contact member, or to an intermediate member interposed between the socket or pin contact member and the wire barrel member to provide an elongated contact assembly, or a pin/socket assembly as desired.

What is claimed is:

1. A contact assembly for electrically connecting a first electrical article and a second electrical article to define a discrete electrical circuit therebetween, comprising:

a conductive first member and a conductive second member and a conductive intermediate member to be disposed therebetween, said first member having a first assembly face with a securing section and further defining at an opposed face thereof a first connection section for forming an electrical connection with a complementary connection section of said first electrical article, said second member having a second assembly face with a securing section and further defining at an opposed face thereof a second connection section for forming an electrical connection with a complementary connection section of said second electrical article, and said intermediate member being of selected length and having opposed first and second mounting faces each associated with a respective one of said first and second members at first and second assembly interfaces and having a respective securing section;

one of said first assembly face and said first mounting face having its securing section defined by a small diameter bore extending thereinto, and the other thereof having its securing section defined by a cylindrical embossment extending therefrom;

one of said second assembly face and said second mounting face having its securing section defined by a small diameter bore extending thereinto, and the other thereof having its securing section defined by a cylindrical embossment extending therefrom; and each said cylindrical embossment being of solid material and having a diameter slightly larger than the diameter of said small diameter bore of said one member, and each said small diameter bore being defined into otherwise solid material of the respective said securing face, wherein said first and second members are affixable to said intermediate member by a said cylindrical embossment being force fitted into a said small diameter bore under sufficient insertion force, and with the dimensions of said small diameter bores and said cylindrical embossments preselected to define a substantial desired retention force upon assembly sufficient to define durable joints to enable the assembly to be manipulated as a unit during subsequent electrical connection with the first and second electrical articles, whereby an elongate contact assembly is defined upon assembly of said first, intermediate and second members.

2. A contact assembly as set forth in claim 1 wherein said securing section of one of said first and second mounting faces of said intermediate member is a said cylindrical embossment and the other thereof is a said small diameter bore.

3. A contact assembly as set forth in claim 1 wherein at least one of said first and second connection sections is a socket contact section.

4. A contact assembly as set forth in claim 1 wherein at least one of said first and second connection sections is a pin contact section.

5. A contact assembly as set forth in claim 1 wherein at least one of said first and second members is a wire barrel including a wire-receiving aperture extending thereinto from a wire-receiving face.

6. A contact assembly as set forth in claim 1 wherein said intermediate member has a cylindrical cross-section.

7. A contact assembly as set forth in claim 1 wherein said intermediate member has a noncylindrical cross-section.

8. A kit of parts for forming a contact assembly for a discrete electrical circuit comprising a conductive first member and a conductive second member and at least one conductive intermediate member of selected length, said first member having an assembly face with a securing section and further defining at an opposed face thereof a connection section for forming an electrical connection with a complementary connection section of a first electrical article, said second member having an assembly face with a securing section and further defining at an opposed face thereof a connection section for forming an electrical connection with a complementary connection section of a second electrical article, said second member further including a small diameter bore extending into an assembly face, said intermediate member including opposed mounting faces associated with respective said assembly faces of said first and second members and securable thereto at first and second assembly interfaces;

each said assembly interface including a cylindrical embossment extending from one of said assembly face and mounting face and a small diameter bore extending into the other of said assembly face and mounting face for receipt thereinto of said cylindrical embossment, said cylindrical embossments each having a diameter slightly larger than the diameter of said small diameter bore and with the dimensions of said small diameter bores and said cylindrical embossments preselected to define a substantial desired retention force upon assembly sufficient to assuredly self-retain said first and second members to each other thereafter; and said intermediate member including a said cylindrical embossment at one said mounting face and a said small diameter bore at the other said mounting face, wherein said first member is either affixable to said second member or is affixable to said intermediate member which is affixable to said second member, defining a kit of parts enabling assembly of a contact assembly of a desired one of at least two different lengths.

9. A kit of parts as set forth in claim 8 wherein at least one of said first and second connection sections is a socket contact section.

10. A kit of parts as set forth in claim 8 wherein at least one of said first and second connection sections is a pin contact section.

11. A kit of parts as set forth in claim 8 wherein at least one of said first and second members is a wire barrel including a wire-receiving aperture extending thereinto from a wire-receiving face.

12. A kit of parts as set forth in claim 8 wherein said intermediate member has a cylindrical cross-section.

13. A kit of parts as set forth in claim 8 wherein said intermediate member has a noncylindrical cross-section.

14. A contact assembly for electrically connecting a first electrical article and a second electrical article at respective pin-and-socket interfaces adapted for mating and unmating, to define a discrete electrical circuit therebetween, comprising:

a conductive first member and a conductive second member, said first member having a first assembly face with a securing section and further defining at a mating face thereof a first connection section for mating with a complementary connection section of said first electrical article, in a manner permitting unmating therefrom, said second member having a second assembly face with a securing section and further defining at a mating face thereof a second connection section for mating with a complementary connection section of said second electrical article, in a manner permitting unmating therefrom, and one of said first and second assembly faces having its securing section defined by a small diameter bore extending into said assembly face thereof, and the other thereof having its securing section defined by a cylindrical embossment extending from an assembly face thereof; and said cylindrical embossment having a diameter slightly larger than the diameter of said small diameter bore, wherein said first and second members are affixable to each other by said cylindrical embossment being force fitted into said small diameter bore under sufficient insertion force, and with the dimensions of said small diameter bores and said cylindrical embossments preselected to define a substantial desired retention force upon assembly sufficient to assuredly self-retain said first and second members to each other thereafter, whereby a contact assembly is defined upon assembly of said first and second members having a contact section at each end adapted to permit mating with and unmating from complementary contact sections of other electrical articles, and the contact assembly is modular enabling a contact member having a pin contact section to be assembled to a contact member having either a pin or socket contact section as desired and enabling a member having a socket contact section to be assembled to a contact member having either a pin or socket contact section as desired.

15. A contact assembly as set forth in claim 14 wherein one of said first and second contact members has a pin contact section and the other thereof has a socket contact section.

* * * * *